(12) United States Patent
Detemmerman et al.

(10) Patent No.: US 11,512,237 B2
(45) Date of Patent: Nov. 29, 2022

(54) ROOM TEMPERATURE CURABLE COMPOSITIONS

(71) Applicant: DOW SILICONES CORPORATION, Midland, MI (US)

(72) Inventors: Tommy Detemmerman, Wezembeek-oppem (BE); Tatiana Dimitrova, Braine-l'Alleud (BE); Frederic Gubbels, Houtain-le-Val (BE)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/132,475

(22) Filed: Dec. 23, 2020

(65) Prior Publication Data

US 2021/0108114 A1  Apr. 15, 2021

Related U.S. Application Data

(63) Continuation-in-part of application No. 15/777,380, filed as application No. PCT/EP2016/078206 on Nov. 18, 2016, now Pat. No. 10,889,738.

(30) Foreign Application Priority Data

Nov. 20, 2015 (GB) ..................................... 1520461
Nov. 2, 2016 (GB) ..................................... 1618505

(51) Int. Cl.
| | | |
|---|---|---|
| C08L 83/06 | (2006.01) | |
| C09J 183/04 | (2006.01) | |
| C08G 77/20 | (2006.01) | |
| C08G 77/24 | (2006.01) | |
| C08G 77/26 | (2006.01) | |
| C08L 71/08 | (2006.01) | |
| C08K 5/42 | (2006.01) | |
| C08K 5/5419 | (2006.01) | |
| C08G 77/16 | (2006.01) | |
| C08G 77/08 | (2006.01) | |
| C08K 5/06 | (2006.01) | |

(52) U.S. Cl.
CPC ............ *C09J 183/04* (2013.01); *C08G 77/08* (2013.01); *C08G 77/16* (2013.01); *C08G 77/20* (2013.01); *C08G 77/24* (2013.01); *C08G 77/26* (2013.01); *C08K 5/06* (2013.01); *C08K 5/42* (2013.01); *C08K 5/5419* (2013.01); *C08L 71/08* (2013.01); *C08G 2170/00* (2013.01); *C08L 83/06* (2013.01); *C08L 2205/025* (2013.01); *C08L 2205/03* (2013.01); *C08L 2312/08* (2013.01); *C09J 2301/30* (2020.08); *C09J 2301/408* (2020.08)

(58) Field of Classification Search
CPC ............ C08L 83/04; C08L 83/06; C08K 5/06

USPC .............................................. 528/17, 18, 34
See application file for complete search history.

(56) References Cited

U.S. PATENT DOCUMENTS

| | | |
|---|---|---|
| 4,247,442 A | 1/1981 | Shimizu |
| 4,831,070 A | 5/1989 | McInally et al. |
| 4,968,760 A | 11/1990 | Schiller et al. |
| 5,138,009 A | 8/1992 | Inoue |
| 5,223,495 A | 6/1993 | Inoue et al. |
| 6,545,104 B1 | 4/2003 | Mueller et al. |
| 7,740,664 B2 | 6/2010 | Benabdillah |
| 9,005,639 B2 | 4/2015 | Bekemeier et al. |
| 9,005,640 B2 | 4/2015 | Bekemeier et al. |
| 10,889,738 B2 | 1/2021 | Detemmerman et al. |
| 2002/0120057 A1 | 8/2002 | Gosselink et al. |
| 2003/0065086 A1 | 4/2003 | Kosal |
| 2004/0058845 A1 | 3/2004 | Metrot et al. |
| 2005/0048124 A1 | 3/2005 | Sarangapani |
| 2005/0288415 A1 | 12/2005 | Beers et al. |
| 2007/0173596 A1 | 7/2007 | Landon et al. |
| 2007/0212314 A1 | 9/2007 | Murphy et al. |
| 2008/0295960 A1 | 12/2008 | Schalau, II et al. |
| 2008/0311396 A1 | 12/2008 | Hamada et al. |
| 2009/0004123 A1 | 1/2009 | Manuszak et al. |
| 2010/0069531 A1* | 3/2010 | Sakamoto ............... C08L 83/04 524/265 |
| 2010/0234517 A1 | 9/2010 | Plantenberg et al. |
| 2011/0311723 A1 | 12/2011 | Bekemeier et al. |
| 2012/0109036 A1 | 5/2012 | Sambasivam et al. |
| 2013/0338289 A1 | 12/2013 | Jadot et al. |

(Continued)

FOREIGN PATENT DOCUMENTS

| | | |
|---|---|---|
| CN | 1914281 A | 2/2007 |
| CN | 103403075 A | 11/2013 |

(Continued)

OTHER PUBLICATIONS

English language abstract JP 56-076452, Jun. 1981.*

(Continued)

*Primary Examiner* — Margaret G Moore
(74) *Attorney, Agent, or Firm* — Warner Norcross + Judd LLP

(57) ABSTRACT

A room temperature curable sealant/adhesive composition is disclosed. The room temperature curable sealant/adhesive composition comprises: A) one or more organopolysiloxanes; B) a hydrophilic material; C) a cross-linker; D) a titanate catalyst and/or a zirconate catalyst; and E) one or more optional ingredients. A silicone elastomer formed therefrom and related methods are also disclosed. In general, such compositions (upon several hours of contact with water) do not repel water, but rather retain and pick-up water and/or can be wetted by aqueous materials subsequent to exposure.

20 Claims, 1 Drawing Sheet

(56) References Cited

U.S. PATENT DOCUMENTS

| | | |
|---|---|---|
| 2014/0127140 A1 | 5/2014 | Ferritto et al. |
| 2014/0220843 A1 | 8/2014 | Liu et al. |
| 2014/0350176 A1 | 11/2014 | Fisher et al. |
| 2018/0215877 A1 | 8/2018 | Hori et al. |
| 2019/0192387 A1 | 6/2019 | Hori et al. |
| 2020/0063009 A1 | 2/2020 | Detemmerman et al. |
| 2020/0339915 A1 | 10/2020 | Dimitrova et al. |

FOREIGN PATENT DOCUMENTS

| | | |
|---|---|---|
| CN | 104559910 A | 4/2015 |
| CN | 104710960 A | 6/2015 |
| CN | 104736138 A | 6/2015 |
| CN | 104774587 A | 7/2015 |
| EP | 0315333 A2 | 5/1989 |
| EP | 0425121 A2 | 5/1991 |
| EP | 0802233 A2 | 10/1997 |
| GB | 2518468 A | 3/2015 |
| JP | S5676452 A | 6/1981 |
| JP | S5676453 A | 6/1981 |
| JP | 2008069869 A | 3/2008 |
| WO | 2000024851 A2 | 5/2000 |
| WO | 2000024856 A1 | 5/2000 |
| WO | 2000024858 A1 | 5/2000 |
| WO | 2003002809 A1 | 1/2003 |
| WO | 2005021058 A2 | 3/2005 |
| WO | 2008039654 A2 | 4/2008 |
| WO | 2011051236 A2 | 5/2011 |
| WO | 2012119940 A1 | 9/2012 |
| WO | 2015082877 A1 | 6/2015 |
| WO | 2016008022 A1 | 1/2016 |
| WO | 2017018358 A1 | 2/2017 |
| WO | 2017085296 A1 | 5/2017 |
| WO | 2017221940 A1 | 12/2017 |
| WO | 2019126010 A1 | 6/2019 |

OTHER PUBLICATIONS

English language translation JP 56-076452, Jun. 1981.*

PCT/EP2016/078206 International Search Report dated Jan. 26, 2017, 4 pages.

Chen, Wei-Fu et al., "Covalently Cross-Linked Perfluorosulfonated Membranes with Polysiloxane Framework", Macromolecules 2007, vol. 40, No. 6, pp. 1987-1994.

Zhongzhan, Sun et al., "Synthesis and characterization of a new-type Schiff base side-chain polysiloxan[e] liquid crystal containing sulfonate groups", New Chemical Materials 2011, vol. 39, No. 5, pp. 56-58 (with English Abstract).

Machine assisted English translation of CN1914281A obtained from https://patents google.com/patent on Mar. 25, 2021, 27 pages.

Machine assisted English translation of CN104559910A obtained from https://patents.google.com/patent on Mar. 25, 2021, 5 pages.

Machine assisted English translation of CN104710960A obtained from https://patents.google.com/patent on Mar. 25, 2021, 7 pages.

Machine assisted English translation of CN104774587A obtained from https://patents.google.com/patent on Mar. 25, 2021, 7 pages.

Examiner's English translation of JPS5676452A (from Parent application), 7 pages.

Machine assisted English translation of JP2008069869A obtained from https://patents.google.com/patent on Mar. 25, 2021, 6 pages.

Machine assisted English translation of JPS5676453A obtained from https://worldwide.espacenet.com/patent on Jul. 23, 2020, 5 pages.

N.J. Mills, "The Rheological Properties and Molecular Weight Distribution of Polydimethylsiloxane", European Polymer Journal, 1969, vol. 5, pp. 675-695.

International Search Report for PCT/US2018/065956 dated Apr. 3, 2019, 4 pages.

International Search Report for PCT/US2018/065950 dated Mar. 22, 2019, 4 pages.

* cited by examiner

ROOM TEMPERATURE CURABLE COMPOSITIONS

CROSS-REFERENCE TO RELATED APPLICATIONS

This application is a continuation-in-part application of U.S. patent application Ser. No. 15/777,380 filed on 18 May 2018, and now U.S. Pat. No. 10,889,738, which is the national stage application of International Application No. PCT/EP2016/078206 filed on 18 Nov. 2016, which claims priority to and all advantages of GB Patent Application No. 1618505.0 filed on 2 Nov. 2016 and GB Patent Application No. 1520461.3 filed on 20 Nov. 2015, the contents of which are hereby incorporated by reference.

TECHNICAL FIELD

This disclosure relates to silicone room temperature curable sealant/adhesive compositions, and in particular to silicone room temperature curable sealant/adhesive compositions which—upon several hours of contact with water—do not repel water, but rather retain and pick-up water and/or can be wetted by aqueous materials subsequent to exposure.

BACKGROUND OF THE INVENTION

Typically cured silicone materials are substantially hydrophobic and have low surface energy surfaces. Some of their most important uses, e.g. as sealants and/or caulks, utilise these physical properties as they require minimal if any water ingress. However, one drawback to having low surface energies is that they are wetted by very few materials (if wetted at all); thus making the silicone sealants extremely difficult to paint.

Silicone room temperature curable sealant/adhesive compositions may generate vapour permeable elastomeric materials which can be formulated to be both inert to the skin and provide adhesion to skin, e.g. in the form of pressure sensitive adhesives. Such materials have a wide range of applications including medical adhesives, wound care coatings/pads, skin care and ostomy care.

EP0315333 describes mouldable elastomeric pressure sensitive adhesive compositions and their preparation, particularly solventless, mouldable compositions which can be moulded and cured at room temperature and which are useful for making medical adhesives. WO2015/082877 describes skin compatible curing adhesives for adhering devices or appliances to the mammalian body.

There remains an opportunity for providing silicone room temperature curable sealant/adhesive compositions and resulting cured elastomers which do not repel water, but rather retain and pick-up water and/or can be wetted by aqueous materials subsequent to exposure.

SUMMARY OF THE INVENTION

There is provided herein a silicone room temperature curable sealant/adhesive composition. In general, the composition comprises:
A) at least 50% by weight of one or more organopolysiloxanes selected from

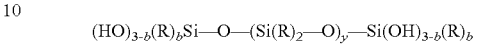

where each R is free of aliphatic unsaturation and is independently selected from the group consisting of monovalent hydrocarbon, monovalent halohydrocarbon, and monovalent cyanoalkyl radicals having from 1 to 18 carbon atoms, each R" is independently a monovalent hydrocarbon group having 1 to 6 carbon atoms, Z is a divalent hydrocarbon radical or combination of divalent hydrocarbon radicals and siloxane radicals, a is 0 or 1, and x is of a value such that component A)(i) has a viscosity of from 0.5 to 3000 Pa·s at 25° C.;
(ii) alpha, omega-diorganopolysiloxanes of the formula $$(HO)_{3-b}(R)_b Si—O—(Si(R)_2—O)_y—Si(OH)_{3-b}(R)_b$$

where each R is free of aliphatic unsaturation and is independently selected from the group consisting of monovalent hydrocarbon, monovalent halohydrocarbon, and monovalent cyanoalkyl radicals having from 1 to 18 carbon atoms, b is 0, 1 or 2, and y is of a value such that component A)(ii) has a viscosity of from 0.5 to 3000 Pa·s at 25° C.; or
(iii) mixtures of the above. The composition further comprises:
B) 5 to 35% by weight of a hydrophilic material selected from
(i) hydrophilic and/or water soluble resins based on polyethylene oxide and/or polypropylene oxide;
(ii) one or more anionic surfactants;
(iii) polymers containing ionisable groups; or
(iv) mixtures of two or more of (i), (ii), and (iii). The composition further comprises:
C) 0.5 to 7.5% by weight of a cross-linker selected from a silane or siloxane cross-linker containing at least two, alternatively three or more, alkoxy or alkenyloxy groups, or silyl functional molecules having at least two silyl groups, each silyl group containing at least one alkoxy or alkenyloxy group. The composition further comprises:
D) 0.5 to 5% by weight of a titanate catalyst and/or a zirconate catalyst. Optionally, the composition further comprises:
E) one or more ingredients selected from the group consisting of fillers, co-catalysts, rheological modifiers, plasticisers, adhesion promoters, compatibilizers, pigments, heat stabilizers, flame retardants, UV stabilizers, chain extenders, electrically and/or heat conductive fillers, fungicides/biocides, and combinations thereof. The total % by weight of components A)+B)+C)+D)+E) is 100%.

DETAILED DESCRIPTION OF THE INVENTION

Figure 1:
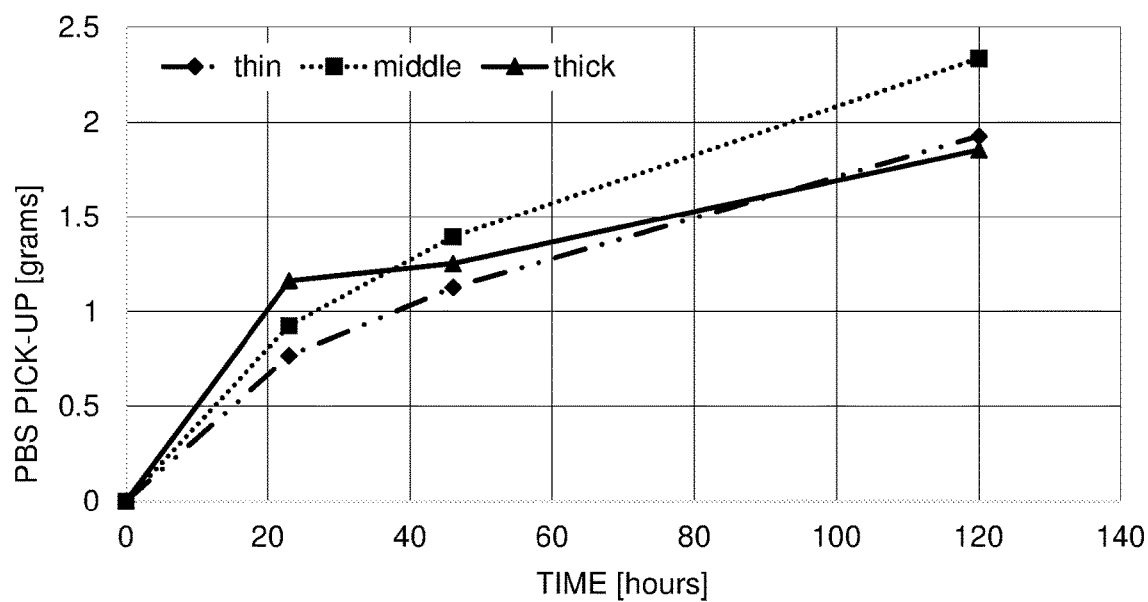
FIG. 1 is a chart showing water uptake (WU) of samples of similar surface but different bulk.

The composition comprises components A), B), C), and D), and optionally component E). In certain embodiments, the composition consists essentially of components A), B), C), and D), and optionally component E). In specific embodiments, the composition consists of components A), B), C), and D), and optionally component E).
Component A)
Component A) is present in the composition in an amount of at least 50% by weight based on the total weight of the composition (e.g. based on 100% by weight of components A) to D) and optionally component E)). In various embodiments, component A) is present in an amount of at least 55, alternatively at least 60, alternatively at least 65, alternatively at least 70, alternatively at least 75, alternatively at least 80, alternatively at least 85, or alternatively at least 90, % by weight, each based on the total weight of the composition. In further or alternate embodiments, component A) is present in an amount no greater than 95, alternatively no greater than 90, alternatively no greater than 85, alternatively no greater than 80, alternatively no greater than 75, alternatively no greater than 75, alternatively no greater than 70, alternatively no greater than 65, alternatively no greater than 60, or alternatively no greater than 55, % by weight, each based on the total weight of the composition. Various ranges are contemplated between the aforementioned lowermost and uppermost end points. As just one example, component A) may be utilized in amount of from about 65 to about 90% by weight based on 100% by weight of components A) to D) and optionally component E).

Component A) is one or more organopolysiloxanes selected from A) (i), A) (ii), or A) (iii) as described herein. In certain embodiments, component A) comprises or is A) (i). In further or other embodiments, component A) comprises or is A) (ii). In yet further or alternate embodiments, component A) comprises or is A) (iii).

Component A) (i) comprises or is an organopolysiloxane of the general formula:

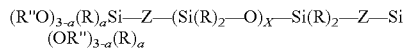

where each R is free of aliphatic unsaturation and is independently selected from the group consisting of monovalent hydrocarbon, monovalent halohydrocarbon, and monovalent cyanoalkyl radicals having in each case of from 1 to 18 carbon atoms, alternatively 1 to 10 carbon atoms, or alternatively 1 to 6 carbon atoms, such as methyl, ethyl, propyl, or butyl. Each R" is independently a monovalent hydrocarbon group having 1 to 6 carbon atoms, such as methyl, ethyl, propyl, or butyl. Z is a divalent hydrocarbon radical, alternatively a divalent hydrocarbon radical having from 1 to 10 carbon atoms, alternatively 1 to 6 carbon atoms, or a combination of said divalent hydrocarbon radicals and divalent siloxane radicals. Subscript a is 0 or 1, and subscript x is of a value such that the organopolysiloxane/polymer has a viscosity of from 0.5 to 3000 Pa·s at 25° C. In certain embodiments, the organopolysiloxane/polymer has a viscosity of from 1 to 2000, alternatively of from 5 to 1000, alternatively of from 10 to 500, alternatively of from 25 to 250, or alternatively of from 50 to 100, Pa·s at 25° C. Viscosity measurements can be measured using a suitable Brookfield viscometer, although this disclosure is not limited to a particular technique.

Component A) (ii) comprises or is an alpha, omega-diorganopolysiloxane of the formula:

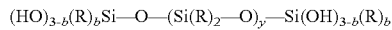

where each R is free of aliphatic unsaturation and is independently selected from the group consisting of monovalent hydrocarbon, monovalent halohydrocarbon, and monovalent cyanoalkyl radicals having in each case of from 1 to 18 carbon atoms, alternatively 1 to 10 carbon atoms, or alternatively 1 to 6 carbon atoms, such as methyl, ethyl, propyl, or butyl. Subscript b is 0, 1 or 2, and subscript y is of a value such that the alpha, omega-diorganopolysiloxane/polymer has a viscosity of from 0.5 to 3000 Pa·s at 25° C. In certain embodiments, the alpha, omega-diorganopolysiloxane/polymer has a viscosity of from 1 to 2000, alternatively of from 5 to 1000, alternatively of from 10 to 500, alternatively of from 25 to 250, or alternatively of from 50 to 100, Pa·s at 25° C.

In general, the relationship of molecular weight to viscosity of polydimethylsiloxane is described in scientific literature, e.g., Mills, E., European Polymer Journal, 1969, vol. 5, p. 675-695. The formula published in this article can be used to calculate approximately the weight average molecular weight of polymers (Mw) with an accuracy of about 10%. For condensation polymerization, the polydispersity index (PI) is the ratio (Mw/Mn), and is approximately two. From this relationship, the average molecular weight in number (Mn) can be calculated or at least estimated. The Mn and Mw of silicone can also be determined by Gel Permeation Chromatography (GPC) with a precision of about 10-15%. This technique is a standard technique, and yields values for Mw (weight average), Mn (number average) and polydispersity index (PI) (where PI=Mw/Mn). In various embodiments, component A) (ii) has a number average molecular weight (Mn) of from 1000 to 1000000.

Component A) (iii) comprises mixtures of A) (i) and A) (ii). In various embodiments, the mixture may be in a ratio of A) (i) to A) (ii) of from 10:1 to 1:10, alternatively of from 5:1 to 1:5, or alternatively 1:1.

Component B)

Component B) is present in the composition in an amount of at least 5% by weight based on the total weight of the composition (e.g. based on 100% by weight of components A) to D) and optionally component E)). In various embodiments, component B) is present in an amount of at least 7.5, alternatively at least 10, alternatively at least 12.5, alternatively at least 15, alternatively at least 17.5, alternatively at least 20, alternatively at least 25, or alternatively at least 30, % by weight, each based on the total weight of the composition. In further or alternate embodiments, component B) is present in an amount no greater than 35, alternatively no greater than 30, alternatively no greater than 25, alternatively no greater than 22.5, alternatively no greater than 20, alternatively no greater than 17.5, alternatively no greater than 15, alternatively no greater than 12.5, alternatively no greater than 10, or alternatively no greater than 7.5, % by weight, each based on the total weight of the composition. Various ranges are contemplated between the aforementioned lowermost and uppermost end points. As just one example, component B) may be utilized in amount of from about 7.5 to about 30% by weight based on 100% by weight of components A) to D) and optionally component E).

Component B) is one or more hydrophilic materials selected from B) (i), B) (ii), B) (iii), or B) (iv) as described herein. In certain embodiments, component B) comprises or is B) (i). In further or other embodiments, component B) comprises or is B) (ii). In yet further or alternate embodiments, component B) comprises or is B) (iii). In yet even further or alternate embodiments, component B) comprises or is B) (iv).

The hydrophilic material may be B) (i), which are hydrophilic and/or water soluble polyoxyalkylene resins and/or polymers. Such polyoxyalkylene compounds generally comprise predominantly oxyalkylene polymer comprised of recurring oxyalkylene units, (—$C_nH_{2n}$—O—) illustrated by the average formula (—$C_nH_{2n}$—O—)$_y$ wherein n is an integer from 2 to 4 and y is an integer of at least four. Moreover, the oxyalkylene units are not necessarily identical throughout the polyoxyalkylene monomer, but can differ from unit to unit. A polyoxyalkylene, for example, can be comprised of oxyethylene units (—$C_2H_4$—O—), or oxypropylene units (—$C_3H_6$—O—), or oxybutylene units (—$C_4H_8$—O—), or mixtures thereof. The number average molecular weight of each polyoxyalkylene polymer may range from about 300, alternatively from about 5000 to tens of millions. Herein, high number average molecular weight polymers/resins, e.g., >50 000, alternatively>75 000, alternatively of from 75 000 to 20 000 000, or alternatively of from 75 000 to 10 000 000, may be used. The number average molecular weight is the total weight of the sample divided by the number of molecules in the sample and was determined by gel permeation chromatography (GPC) using a triple detection capability (e.g. a Viscotek TDA305 unit) composed of a differential refractometer, an online differential pressure viscometer and low angle light scattering (e.g. LALS: 7° and 90° angles of detection). Suitable hydrophilic and/or water soluble polyoxyalkylene resins and/or polymers are commercially available. Specific examples include those under the trademark POLYOX®, such as the POLYOX® WSR product line, e.g. POLYOX® WSR 205@, from DuPont. In certain embodiments, the composition is substantially free of, or alternatively completely free of, silane-modified (poly)akylene oxide (e.g. EO and/or PO) compounds. In further or alternate embodiments, the composition is substantially free of, or alternatively completely free of, siloxane-modified (poly)akylene oxide (e.g. EO and/or PO) compounds. The phrase "substantially free of" generally means that the composition includes less than 5, alternatively less than 2, alternatively less than 1, alternatively less than 0.1, or alternatively approaching 0, parts by weight, of the associated component/compound, based on 100 parts by weight of the composition.

Component B) (i) can be present in the composition in the amounts described above for component B). In certain embodiments, component B) (i) is present in the composition in amount of from about 10 to about 30% by weight based on 100% by weight of components A) to D) and optionally component E).

The hydrophilic material may be B) (ii), which are anionic surfactants. Such surfactants include sodium/potassium sulphonates, alkenyl sulphonates, alkyl sulphates, alkyl-benzene sulphonates, potassium alkyl phosphates, alkyl succinates, alkyl sulphosuccinates and N-alkyl sarcosinates and sodium, magnesium, ammonium, and the mono-, di- and triethanolamine salts of alkyl and aralkyl sulphates as well as the salts of alkaryl sulphonates. The alkyl groups generally have a total of from about 12 to 21 carbon atoms, may be unsaturated, and are preferably fatty alkyl groups. The sulphates may be sulphate ethers containing one to ten ethylene oxide (EO) or propylene oxide (PO) units per molecule. In certain embodiments, the sulphate ethers contain two to three EO units.

Typical anionic surfactants include, among others, sodium lauryl sulphate, sodium lauryl ether sulphate, ammonium lauryl sulphate, triethanolamine lauryl sulphate, sodium C14-16 olefin sulphonate, ammonium pareth-25 sulphate (ammonium salt of a sulphated polyethylene glycol ether of a mixture of synthetic C12-15 fatty alcohols), sodium myristyl ether sulphate, ammonium lauryl ether sulphate, disodium monooleamidosulphosuccinate, ammonium lauryl sulphosuccinate, sodium dodecylbenzene sulphonate, triethanolamine dodecylbenzene sulphonate and sodium N-lauroyl sarcosinate. The lauryl sulphates include monoethanolamine, triethanolamine, ammonium and sodium lauryl sulphates.

Other suitable anionic surfactants include alkali metal sulphoricinates, sulphonated glyceryl esters of fatty acids such as sulphonated monoglycerides of coconut oil acids, salts of sulphonated monovalent alcohol esters such as sodium oleoyl isethionate, amides of amino sulphonic acids such as the sodium salt of oleyl methyl tauride, sulphonated products of fatty acids nitriles such as palmitonitrile sulphonate, sulphonated aromatic hydrocarbons such as sodium alpha-naphthalene monosulphonate, condensation products of naphthalene sulphonic acids with formaldehyde, sodium octahydroanthracene sulphonate, alkylbenzenesulphonic acid alkali metal salts exemplified by hexylbenzenesulphonic acid sodium salt, octylbenzenesulphonic acid sodium salt, decylbenzenesulphonic acid sodium salt, dodecylbenzenesulphonic acid sodium salt, cetylbenzenesulphonic acid sodium salt, and myristylbenzenesulphonic acid sodium salt, sulphuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulphonic acid.

Component B) (ii) can be present in the composition in the amounts described above for component B). In certain embodiments, component B) (ii) is present in the composition in amount of from about 5 to about 20% by weight based on 100% by weight of components A) to D) and optionally component E).

The hydrophilic material may be B) (iii), which are polymers containing ionizable groups. Such ionizable groups include, e.g., pendent sulphonate groups, acetate groups, and/or sulphate groups. Suitable polymer examples include, but are not limited to, homopolymers and copolymers comprising vinylsulphonic, styrenesulphonic, naphthalenesulphonic or acrylamidoalkylsulphonic units and their salts. Polyvinylsulphonic acid salts may include those having a molecular weight of approximately between 1000 and 100 000, and also the copolymers with an unsaturated comonomer such as acrylic or methacrylic acids and their esters, and also acrylamide or its derivatives, vinyl ethers and vinylpyrrolidone. Sodium salts of polystyrenesulphonic acid, polyacrylamidosulphonic acid salts, e.g., polyacrylamidoethylpropanesulphonic acid. Polyvinyl alcohols may be utilized and are generally prepared by saponification of polyvinyl acetate.

Component B) (iii) can be present in the composition in the amounts described above for component B). In certain embodiments, component B) (iii) is present in the composition in amount of from about 10 to about 30% by weight based on 100% by weight of components A) to D) and optionally component E)

The hydrophilic material may be B) (iv), which is a mixture of two of more of component B) above. Such component B) can comprise any mixture of B) (i) and/or B) (ii) and/or B) (iii) in any suitable amount or ratio.

Component C)

Component C) is present in the composition in an amount of at least 0.5% by weight based on the total weight of the composition (e.g. based on 100% by weight of components A) to D) and optionally component E)). In various embodiments, component B) is present in an amount of at least 0.75, alternatively at least 1, alternatively at least 2, alternatively at least 3, alternatively at least 4, alternatively at least 5, alternatively at least 6, or alternatively at least 7, % by weight, each based on the total weight of the composition. In further or alternate embodiments, component C) is present in an amount no greater than 7.5, alternatively no greater than 7, alternatively no greater than 6, alternatively no greater than 5, alternatively no greater than 4, alternatively no greater than 3, alternatively no greater than 2, alternatively no greater than 1, or alternatively no greater than 0.75, % by weight, each based on the total weight of the composition. Various ranges are contemplated between the aforementioned lowermost and uppermost end points. As just one example, component C) may be utilized in amount of from about 1 to about 2% by weight based on 100% by weight of components A) to D) and optionally component E).

Component C) is a suitable cross-linker containing at least two, alternatively three or more alkoxy or alkenyloxy groups. Any suitable alkoxy type or alkenoxy type cross-linker may be used. These include one or more silanes or siloxanes which contain silicon bonded alkoxy groups such as methoxy, ethoxy or propoxy groups and silicon bonded alkenyloxy groups (for example isopropenyloxy and 1-ethyl-2-methylvinyloxy). Another type of cross-linker that might be used are silyl functional molecules having at least two silyl groups, each silyl group containing at least one hydrolysable group.

In the case of siloxane based cross-linkers and silyl functional molecules the molecular structure can be straight chained, branched, or cyclic.

In various embodiments, the cross-linkers C) may have two, but generally have three or four, silicon-bonded alkoxy and/or alkenyloxy groups per molecule which are reactive with the condensable groups in organopolysiloxane polymer A). When the cross-linker is a silane and when the silane has three silicon-bonded alkoxy and/or alkenyloxy groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. In general however, the fourth silicon-bonded organic groups is methyl.

Silanes which can be used as cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, and isobutyltrimethoxysilane (iBTM). Other suitable silanes include ethyltrimethoxysilane, vinyltriethoxysilane, phenyltrimethoxysilane, 3,3,3-trifluoropropyltrimethoxysilane, phenyl-tripropionoxysilane, methyltris(isopropenoxy)silane, vinyltris(isopropenoxy)silane, ethylpolysilicate, n-propylorthosilicate, ethylorthosilicate, or any combination of two or more of the above.

A typical silane may be described by $R''_{4-r}Si(OR^5)_r$ wherein $R^5$ is an alkyl group having from 1 to 6 carbon atoms and subscript r has a value of 2, 3 or 4. R" is an organic radical selected from linear and branched alkyls, allyls, phenyl and substituted phenyls. Typical silanes are those wherein R" represents methyl, ethyl or vinyl or isobutyl. In some instances, $R^5$ represents methyl or ethyl and subscript r is 3.

Another type of suitable cross-linkers are molecules of the type $Si(OR^5)_4$ where $R^5$ is an alkyl group having from 1 to 6 carbon atoms, alternatively propyl, ethyl or methyl. Partials condensates of $Si(OR^5)_4$ may also be considered.

Alternatively, cross-linkers C) may comprise the hereinbefore described silyl functional molecules having at least two silyl groups, each silyl group containing at least one hydrolysable group.

For the sake of the disclosure herein silyl functional molecule is a silyl functional molecule containing two or more silyl groups, each silyl group containing at least one hydrolysable group. Hence, a disilyl functional molecule comprises two silicon atoms each having at least one hydrolysable group, where the silicon atoms are separated by an organic or siloxane spacer. Generally, the silyl groups on the disilyl functional molecule may be terminal groups. The spacer may be a polymeric chain. The cross-linker C) may be a disilyl functional polymer, that is, a polymer containing two silyl groups, each containing at least one hydrolysable group such as described by $R''_{3-y}Si(OR^5)_yRv\text{-}Si(OR^5)_zR''_{3-z}$ where R" and $R^5$ are as described above, subscripts y and z are independently an integer of 1, 2 or 3, alternatively 2 or 3. Rv is a divalent hydrocarbon radical, alternatively a divalent hydrocarbon radical having from 1 to 10 carbon atoms, or further alternatively 1 to 6 carbon atoms or a combination of said divalent hydrocarbon radicals and divalent siloxane radicals.

The silyl (e.g. disilyl) functional crosslinker may have a siloxane or organic polymeric backbone. In the case of such siloxane or organic based cross-linkers the molecular structure can be straight chained, branched, cyclic or macromolecular. In the case of siloxane based polymers the viscosity of the cross-linker will be within the range of from 0.5 mPa·s to 80,000 mPa·s at 25° C.

Examples of disilyl polymeric cross-linkers with a silicone or organic polymer chain bearing alkoxy functional end groups include polydimethylsiloxanes having at least one trialkoxy terminal where the alkoxy group may be a methoxy or ethoxy group. Examples might include 1,6-bis (trimethoxy silyl)hexane hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxy tetrasiloxane.

Component D)

Component D) is present in the composition in an amount of at least 0.5% by weight based on the total weight of the composition (e.g. based on 100% by weight of components A) to D) and optionally component E)). In various embodiments, component BD is present in an amount of at least 0.75, alternatively at least 1, alternatively at least 1.5, alternatively at least 2, alternatively at least 2.5, alternatively at least 3, alternatively at least 3.5, alternatively at least 4, or alternatively at least 4.5, % by weight, each based on the total weight of the composition. In further or alternate embodiments, component D) is present in an amount no greater than 5, alternatively no greater than 4.5, alternatively no greater than 4, alternatively no greater than 3.5, alternatively no greater than 3, alternatively no greater than 2.5, alternatively no greater than 2, alternatively no greater than 1.5, alternatively no greater than 1, or alternatively no greater than 0.75, % by weight, each based on the total weight of the composition. Various ranges are contemplated between the aforementioned lowermost and uppermost end points. As just one example, component D) may be utilized in amount of from about 0.5 to about 4.5% by weight based on 100% by weight of components A) to D) and optionally component E).

Titanate and/or zirconate based catalysts may comprise a compound according to the general formula $Ti[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{22}$ include but are not restricted to methyl, ethyl, propyl, isopropyl, butyl, tertiary butyl and a branched secondary alkyl group such as 2,4-dimethyl-3-pentyl. Generally, when each $R^{22}$ is the same, $R^{22}$ is an isopropyl, branched secondary alkyl group or a tertiary alkyl group, in particular, tertiary butyl. Alternatively, the titanate may be chelated. The chelation may be with any suitable chelating agent such as an alkyl acetylacetonate (e.g., methyl or ethylacetylacetonate).

Optional Component E)

Component E), if utilized, is present in the composition in a remainder amount. Specifically, component E) can be present in the amount remaining of 100% by weight based on the weight of components A) to D). Various ranges are contemplated between the aforementioned lowermost and uppermost end points of components A) to D).

Dependent on the end use for which the composition is to be used, compositions as described above may contain, suitable components E) which are conventional to the formulation of silicone rubber sealants and the like. For example, the compositions may contain one or more finely divided, reinforcing fillers such as high surface area fumed and precipitated silicas including rice hull ash, commercial examples include AEROSIL® R 974 and AEROSIL® R 812 from Evonik, and to a degree calcium carbonate, or additional non-reinforcing fillers such as crushed quartz, diatomaceous earths, barium sulphate, iron oxide, zeolites (e.g. Zeolite 4A), titanium dioxide, carbon black, talc, wollastonite, etc. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite, etc.

Aluminium oxide, silicates from the group consisting of olivine group; garnet group; aluminosilicates; ring silicates; chain silicates; and sheet silicates, may also be utilized. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$.

The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

The fillers may be surface treated for example with a fatty acid or a fatty acid ester such as a stearate, or with organosilanes, organosiloxanes, or organosilazanes such as hexaalkyl disilazane or short chain siloxane diols to render the filler(s) hydrophobic and therefore easier to handle and obtain a homogeneous mixture with other components. The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

Other ingredients which may be included in the compositions include but are not restricted to co-catalysts for accelerating the cure of the composition such as metal salts of carboxylic acids and amines; rheological modifiers; plasticisers; adhesion promoters; pigments; heat stabilizers; flame retardants; UV stabilizers; chain extenders; electrically and/or heat conductive fillers; fungicides and/or biocides and the like (which may suitably be present in an amount of from 0 to 0.3% by weight); water scavengers; etc. It will be appreciated that some of the additives are included in more than one list of additives. Such additives would then have the ability to function in all the different ways referred to.

Suitable silicone based composition plasticisers are organopolysiloxanes which are unreactive with the siloxane polymer of the composition, such as polydimethylsiloxanes having terminal triorganosiloxy groups wherein the organic substituents are, for example, methyl, vinyl or phenyl or combinations of these groups. Such polydimethylsiloxanes normally have a viscosity of from about 5 to about 100,000 mPa·s at 25° C. An example are siloxanes such as $(CH_3)_3Si$—O—$(Si(R)_2$—O$)_xSi(CH_3)_3$ (commercially available from The Dow Chemical Company as DOW CORNING 200 fluid or the like) with a viscosity of from 100 to 100,000 mPa·s at 25° C.

Suitable rheological modifiers include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols.

Any suitable adhesion promoter(s) may be incorporated in the composition. These may include for example alkoxy silanes such as aminoalkylalkoxy silanes, epoxyalkylalkoxy silanes, for example, 3-glycidoxypropyltrimethoxysilane and, mercapto-alkylalkoxy silanes and γ-aminopropyl triethoxysilane, reaction products of ethylenediamine with silylacrylates. Isocyanurates containing silicon groups such as 1,3,5-tris(trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

Compatibilizers are typically small molecules and/or oligomers with preferentially amphiphilic character which can be used to improve the incorporation of component B) into component A). These could be nonionic emulsifiers of general structure CxEy, where Cx stands for a saturated, linear or branched, aliphatic chain of x carbon atoms and Ey stands for an oligomeric block of Y oxyalkylene units illustrated by the average formula $(-C_nH_{2n}-O-)_Y$ wherein subscript n is an integer from 2 to 4 and Y is an integer between 4 and 30. Typically X is between 8 and 30.

Alternative compatibilizers include silicone polyethers. Both poly(ethylene oxide) and mixed poly(ethylene oxide)/poly(propylene oxide) polar blocks may be grafted to the silicone backbone. Both linear block (A-B, (AB)n, and A-B-A type) and comb structures are available. Typically A is polyoxyalkylene of Z oxyalkylene units illustrated by the average formula $(-C_nH_{2n}-O-)_Z$ wherein subscript n is an integer from 2 to 4 and Y is an integer between 4 and 50. A polyoxyalkylene for example, can be comprised of oxyethylene units $(-C_2H_4-O-)$, or oxypropylene units $(-C_3H_6-O-)$, or oxybutylene units $(-C_4H_8-O-)$, or mixtures thereof. The average molecular weight of each A-fragment may range from about 1000 to about 30000.

Typically B is $(Si(R)_2—O)_X$ in which each R is free of aliphatic unsaturation and is independently selected from the group consisting of monovalent hydrocarbon, monovalent halohydrocarbon, and monovalent cyanoalkyl radicals of in each case 1 to 18 carbon atoms, alternatively in each case 1 to 10 carbon atoms, further alternatively in each case 1 to 6 carbon atoms, such as methyl, ethyl, propyl, or butyl.

Heat stabilizers may include, e.g., iron oxides and carbon blacks, iron carboxylate salts, cerium hydrate, titania, barium zirconate, cerium and zirconium octoates, and porphyrins.

Flame retardants may include, e.g., carbon black, hydrated aluminium hydroxide, and silicates such as wollastonite, platinum and platinum compounds.

Chain extenders may include, e.g., difunctional silanes which extend the length of the polysiloxane polymer chains before crosslinking occurs and, thereby, reduce the modulus of elongation of the cured elastomer. Chain extenders and cross-linkers compete in their reactions with the functional polymer ends; in order to achieve noticeable chain extension, the difunctional silane generally must have substantially higher reactivity than the typical trifunctional cross-linker. Suitable chain extenders for condensation cure systems are, for example, diacetamideosilanes such as dialkyldiacetamidosilanes or alkenylalkyldiacetamidosilanes, particularly methylvinyldi-di(N-methylacetamido)silane diacetoxysilanes, such as dialkyldiacetoxysilanes and alkylalkenyldiacetoxysilanes diaminosilanes, such as dialkyldiaminosilanes or alkylalkenyldiaminosilanes particularly those where each amino group has one Si—N bond and two N—C bonds; dialkoxysilanes such as dialkoxysiloxanes (having from 2 to 25 Si—O linkages), diamidosilanes such as dialkyldiamidosilanes or alkylalkenyldiamidosilanes hexaorganodisilazanes (wherein the organo groups are each independently alkyl groups having 1 to 6 carbon atoms or alkenyl groups having 1 to 6 carbon atoms) diketoximinosilanes such as dialkylkdiketoximinosilanes and alkylalkenyldiketoximinosilanes α-aminoalkyldialkoxyalkylsilanes wherein the alkyl and alkoxy groups contain from 1 to 5 carbon atoms, such as α-aminomethyldialkoxymethylsilanes particularly preferred are those where the aminomethyl group is an N,N-dialkylaminomethyl group.

Electrically conductive fillers may include, e.g., carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include, e.g., metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; ceramic fillers such as tungsten monocarbide, silicon carbide and aluminium nitride, boron nitride and diamond.
Composition (Cont.), Properties, and Applications/Uses Compositions as hereinbefore described have a reasonably quick room temperature cure time (Skin over time—"SOT") of from about 10 to about 70 minutes, or alternatively about 20 to about 30 minutes. They generally cure upon exposure to (atmospheric) moisture.

The compositions may be designed to contain only ingredients with no or acceptably low toxicity, i.e., containing no ingredients causing known adverse effects such as skin irritation and/or sensitization or the like. As will be shown in the following examples, when cured elastomers made from the compositions hereinbefore described are able to uptake (or take up, or absorb) water when in contact with water, aqueous solutions or aqueous dispersions. Equally, elastomers made from the compositions herein may be formulated to provide for desired strength/hardness and elongation and/or other physical properties and the compositions are storage stable in that they can be stored for a prolonged period of time, without losing more that 50% of their mechanical strength upon cure.

Once cured, conventional/standard silicone materials are substantially hydrophobic (see for example the comparative example(s) described below) and as such undergoes practically no water ingress. However, elastomers made from the compositions described herein uptake water in an amount of at least 0.01 gram of water per gram of cured sealant, when the cured sealant is immersed in water or phosphate buffered saline (PBS) for 24 hours. Such compositions may therefore be useful as paintable sealants, (expandable) joint fillers and water adsorption sealants. These might find use in the applications where joint expansion is desired, for controlling and/or restraining the aqueous leaks which are not under pressure, as for example in rims of wound care and cosmetic patches, medical devices, diapers, etc.

Alternatively, cured silicones made from the compositions as hereinbefore described are vapour permeable and inert to the skin and can be formulated to provide adhesion to skin, thus making them candidates as adhesives for cosmetic patches, drug-release patches (for both humans and animals), wound dressings (for both humans and animals), and so on. It might be desirable that these compositions absorb sweat and/or other body fluids.

The follow examples, illustrating the compositions, methods, and applications/uses of this disclosure, are intended to illustrate and not to limit the invention.

EXAMPLES

Definitions

SOT=skin over time. SOT is the time required for a sealant/adhesive composition to cure to the point where it no longer adheres to a clean fingertip lightly touched on the surface thereof. Cure usually takes place at room temperature (RT, e.g. 22-25° C. or as otherwise stated) and 25-35% relative humidity (RH).

CID=cure in depth. The CID test consists of making a 1 cm thick specimen in a cup, allowing the moisture to penetrate only from the air/sealant interface. Samples are allowed to cure for predefined periods of time e.g. 1, 3, and/or 7 days, subsequent to which the thickness of the resulting cured layer is measured.

WU=water uptake (or absorbance). Water absorbance have been tested using well-cured pre-weighed specimens. These were soaked in phosphate buffered saline (PBS). At pre-determined regular intervals, the specimens were taken out of the PBS, wiped to a dry state, and weighed. Alternatively, water can be used instead of PBS.

Formulations (all References to Parts are Intended to Mean Parts by Weight)

Three masterbatches were made for use in the Examples:
Masterbatch type 1 was prepared using 1.75 parts of 1,6-bis(trimethoxy silyl)hexane (cross-linker) and 87 parts of trimethoxy silyl terminated siloxane polymer with a viscosity of about 63000 mPa·s at 25° C.;
Masterbatch type 2 was prepared using 4 parts of cross-linker and 87 parts of the same trimethoxy silyl terminated siloxane polymer; and Masterbatch type 3 was prepared using 8 parts of cross-linker and 87 parts of the same trimethoxy silyl terminated siloxane polymer.

The catalyst in all cases was tetra-n-butyl titanate.

Sealants containing one of the above mentioned masterbatches; different amounts of water pick-up material (i.e., component B)) and catalyst were formulated using a Speed-Mixer® DAC 150.1 FV-K. A 1-2 mm thick smear was immediately applied onto a glass surface to determine SOT.

The rest of the sealant samples were then kept in open cylindrical containers (diameter approx. 4 cm, depth of the sample—3 to 4 cm) for 7 days, exposed at the ambient atmosphere (approx. 50% RH) at 21-25° C. After that time, the skin formed on the top of the sealant is removed.

If a cured layer (skin) of 0.5 to 1.5 cm depth has been formed, the composition is deemed to be a suitable one-component sealant (i.e., 1K sealants). The skin removed from the container is stored for another 24 h to 48 h on a lab bench to allow for complete cure (the side originally facing the bulk was exposed to the atmosphere). Thus obtained cured specimens were then used for evaluation of the water pick-up ability of the formulations.

The initial weight of each sample tested was between 2 and 6 grams, depending on the thickness.

If bulk cure is observed (e.g. the entire sample has cured) the material is considered as suitable for a bi-component sealant (i.e., 2K sealants)

Comparative Example 1

The following comparative example is a standard formulation comprising masterbatch 1 and catalyst (i.e., no component B)).

| | Masterbatch type | Masterbatch amount (g) | Catalyst amount (g) | SOT (min) | Type of cure |
|---|---|---|---|---|---|
| Comparative 1 | 1 | 35.64 | 0.36 | 20 | 1K |

| | Time when weight difference measured (h) | | | |
|---|---|---|---|---|
| | 0 | 22 | 72 | 96 |
| Comparative 1 - weight difference (g) (initial weight 4.197 g) | 0 | 0.008 | 0.007 | 0.01 |

It will be seen that in the absence of component B) of the composition, the water take up even after 96 hours was negligible.

Example 1: Compositions Using Component B) (i) Water Soluble Resin

Example 1a—Composition

In this Example, component B) in the formulation was of the type B) (i) a hydrophilic and/or water soluble resin based on polyethylene oxide and/or polypropylene oxide. The resin used was a POLYOX® resin type WSR 205 which is commercially available from DuPont. POLYOX® WSR 205 is a nonionic, water soluble poly(EO) polymer having a molecular weight of about 600,000 g/mol and a viscosity of about 6,800 to about 8,800 cP. Table 1 below shows the composition of the sealants together with the type of cure and SOT.

TABLE 1

| Formulation Number | Masterbatch type | Masterbatch amount (g) | Catalyst amount (g) | Polyox WSR 205 amount (g) | SOT (min) | Type of cure |
|---|---|---|---|---|---|---|
| 1p | 1 | 35.64 | 0.36 | 4 | 50 | 1K |
| 2p | 1 | 35.28 | 0.72 | 4 | 30 | 1K |
| 3p | 1 | 34.92 | 1.08 | 4 | 35 | 1K |
| 4p | 1 | 34.56 | 1.44 | 4 | 30 | 1K |
| 5p | 1 | 34.2 | 1.8 | 4 | 15 | 1K |
| 6p | 1 | 31.68 | 0.32 | 8 | 45 | 1K |
| 7p | 1 | 31.36 | 0.64 | 8 | 24 | 1K |
| 8p | 1 | 31.04 | 0.96 | 8 | 20 | 1K |
| 9p | 1 | 30.72 | 1.28 | 8 | 10 | 1K |
| 10p | 1 | 30.4 | 1.6 | 8 | 10 | 1K |
| 11p | 1 | 29.255 | 0.25 | 10.5 | 50 | 1K |
| 12p | 1 | 29.01 | 0.49 | 10.5 | 45 | 1K |
| 13p | 1 | 28.765 | 0.74 | 10.5 | 20 | 1K |
| 14p | 1 | 28.52 | 0.98 | 10.5 | 17.5 | 1K |
| 15p | 1 | 28.275 | 1.23 | 10.5 | 15 | 1K |
| 16p | 3 | 34.56 | 1.44 | 4 | 120 | 1K |
| 17p | 3 | 30.4 | 1.6 | 8 | 45 | 1K |

TABLE 1a

Data from Table 1 merely recalculated to mass %

| Formulation Number | Cross-linker, % | Polymer, % | Catalyst, % | Polyox WSR 205, % | Total |
|---|---|---|---|---|---|
| 1p | 1.76 | 87.34 | 0.90 | 10.00 | 100 |
| 2p | 1.74 | 86.46 | 1.80 | 10.00 | 100 |
| 3p | 1.72 | 85.58 | 2.70 | 10.00 | 100 |
| 4p | 1.70 | 84.70 | 3.60 | 10.00 | 100 |
| 5p | 1.69 | 83.81 | 4.50 | 10.00 | 100 |
| 6p | 1.56 | 77.64 | 0.80 | 20.00 | 100 |
| 7p | 1.55 | 76.85 | 1.60 | 20.00 | 100 |
| 8p | 1.53 | 76.07 | 2.40 | 20.00 | 100 |
| 9p | 1.51 | 75.29 | 3.20 | 20.00 | 100 |
| 10p | 1.50 | 74.50 | 4.00 | 20.00 | 100 |
| 11p | 1.44 | 71.69 | 0.62 | 26.25 | 100 |
| 12p | 1.43 | 71.09 | 1.23 | 26.25 | 100 |
| 13p | 1.42 | 70.49 | 1.85 | 26.24 | 100 |
| 14p | 1.41 | 69.89 | 2.45 | 26.25 | 100 |
| 15p | 1.39 | 69.29 | 3.07 | 26.25 | 100 |
| 16p | 1.70 | 84.70 | 3.60 | 10.00 | 100 |
| 17p | 1.50 | 74.50 | 4.00 | 20.00 | 100 |

Example 1 b—Water Pick-Up

A selection of the Samples made above were immersed in PBS and the increase of their weight (g) as a function of time is reported in Table 2 below.

TABLE 2

| Formulation Number | Dry weight before immersion (g) | Weight increase (g) | | | |
|---|---|---|---|---|---|
| | | 0 h | 22 h | 48 h | 72 h | 96 h |
| 1p | 4.197 | 0 | 0.201 | 0.256 | 0.282 | 0.320 |
| 3p | 6.313 | 0 | 0.121 | 0.159 | 0.199 | 0.214 |
| 5p | 5.863 | 0 | 0.091 | 0.148 | 0.175 | 0.208 |
| 6p | 5.646 | 0 | 0.273 | 0.39 | 0.465 | 0.521 |
| 9p | 7.69 | 0 | 0.245 | 0.355 | 0.441 | 0.514 |
| 10p | 5.16 | 0 | 0.185 | 0.261 | 0.339 | 0.389 |
| 11p | 5.064 | 0 | 0.351 | 0.498 | 0.601 | 0.689 |
| 13p | 4.553 | 0 | 0.432 | 0.453 | 0.552 | 0.658 |
| 15p | 2.764 | 0 | 0.281 | 0.44 | 0.536 | 0.638 |
| 11p | 5.589 | 0 | 0.351 | 0.498 | 0.601 | 0.689 |

TABLE 2-continued

| Formulation Number | Dry weight before immersion (g) | Weight increase (g) | | | | |
|---|---|---|---|---|---|---|
| | | 0 h | 22 h | 48 h | 72 h | 96 h |
| 16p | 3.108 | 0 | 0.106 | 0.132 | 0.157 | 0.185 |
| 17p | 3.137 | 0 | 0.276 | 0.519 | 0.493 | 0.514 |

One concludes that the inclusion of a water soluble resin in the compositions enables water to be adsorbed into the resulting cured elastomer as well as a having an SOT of less than 1 h. Surprisingly, although the resin is embedded within a hydrophobic matrix (i.e., the silicone), the materials exhibit a substantial water pick-up (Table 2). Water uptake of the materials lead to the expansion on the testing specimens.

Example 1c—Stability

Two formulations (9p and 14p) were subsequently prepared on a larger scale (330 g) and stored in standard sealant cartridges. One cartridge was kept at room temperature (22-23° C.) and another at 4000+/−2° C. for one week. The latter storage option is used to accelerate the aging of the material. Two mm thick sheets have been casted from the fresh and aged sealant and allowed to cure at 22-23° C. at 50% RH for 7 days. Test dumbbells have been cut and the mechanical properties of these specimens tested following ASTM D412-06. It will be appreciated from the results in Table 3 below that the mechanical properties upon ageing at 40° C. remain comparable within 25% to the initial values. The SOT does not exceed 70 min.

TABLE 3

| | | Formulation 9p-fresh | Formulation 14p-fresh | Formulation 9p-1 wk @ 40° C. | Formulation 14p-1 wk @ 40° C. |
|---|---|---|---|---|---|
| Dumbbells 7 Days cure | SOT (min) | 31 | 15 | 65 | 43 |
| | CID 1 day (mm) | 3.2 | 3.6 | | |
| | Tensile strength (MPa) | 0.61 | 1.03 | 0.51 | 0.77 |
| | Elongation at Break* (%) | 113 | 117 | 141 | 123 |

*also called ultimate elongation in ASTM 412 D-06

Example 1d—Large Scale Preparation

In a 5 L compounder, 4000 g of the following sealant was prepared:

| Ingredient | wt. % |
|---|---|
| trimethoxy silyl terminated siloxane polymer with a viscosity of about 63000 mPa · s at 25° C. | 33.6 |
| 1,6-bis(trimethoxy silyl)hexane | 1.6 |
| Polyox WSR 205 | 30.4 |
| Trimethyl siloxy-terminated polydimethyl siloxane with zero shear viscosity of 3000 Pa · s | 33.6 |
| Tetra-n-butyltitanate (TNBT) | 0.8 |

The material was immediately packed in standard sealant cartridges (ca. 330 g per cartridge). 24 h after the packaging, some of the cartridges were stored in an oven at 40° C., the rest were kept in room temperature (22-2300). 24 h after packaging, the sealant was successfully extruded using a manual cartridge gun. After one week of storage in an oven at 40° C., the sealant was successfully extruded using a manual cartridge gun and no difference in appearance and extrudability was observed in comparison with the fresh sealant.

Example 2: Compositions Using Component B) (ii) Anionic Surfactants

Example 2a—Composition

The methodology described in Example 1a above is used, but the water pick-up component was an anionic surfactant B) (ii). The following materials were used:

BIOTERGEO® AS90 (commercial material from Stepan)—sodium alpha-olefine sulphonate.

HOSTAPURO® SAS 93G (commercial material from Clariant)—secondary alkane sulphonate, sodium salt.

NACCONOL® 90G (commercial material from Stepan)—sodium 10-16) benzenesulphonate.

DISPOLIL® SLS 128 (commercial materials from Cognis)—sodium lauryl sulphates (12-018).

Table 4 below shows the formulation, the type of cure and SOT. "MB" is masterbatch, and "AS" is anionic surfactant. Table 5 further below shows the water pick-up of selected formulations. Stability data is shown in Table 6 yet further below.

TABLE 4

| Formulation Number | MB used | MB amt. (g) | Catalyst amt. (g) | AS used | AS amt. (g) | SOT (min) | Type of cure |
|---|---|---|---|---|---|---|---|
| 1-as | 1 | 23.76 | 0.24 | Bioterge AS 90 | 6 | 50 | 2K |
| 2-as | 1 | 23.52 | 0.48 | Bioterge AS 90 | 6 | 30 | 2K |
| 3-as | 1 | 23.28 | 0.72 | Bioterge AS 90 | 6 | 15 | 1K |
| 4-as | 1 | 23.04 | 0.96 | Bioterge AS 90 | 6 | 13 | 1K |
| 5-as | 1 | 22.8 | 1.2 | Bioterge AS 90 | 6 | 10 | 1K |
| 6-as | 2 | 27.4 | 0.6 | Bioterge AS 90 | 2.04 | 25-30 | 1K |
| 7-as | 3 | 27.42 | 0.6 | Bioterge AS 90 | 2.04 | — | 1K |
| 8-as | 1 | 27.16 | 0.84 | Hostapur SAS 93G | 7 | >240 | 1K |
| 9-as | 1 | 26.88 | 1.12 | Hostapur SAS 93G | 7 | 20 | 1K |

TABLE 4-continued

| Formulation Number | MB used | MB amt. (g) | Catalyst amt. (g) | AS used | AS amt. (g) | SOT (min) | Type of cure |
|---|---|---|---|---|---|---|---|
| 10-as | 1 | 26.6 | 1.4 | Hostapur SAS 93G | 7 | 18 | 1K |
| 11-as | 1 | 26.19 | 0.81 | Hostapur SAS 93G | 3 | — | 1K |
| 12-as | 1 | 25.65 | 1.35 | Hostapur SAS 3G | 3 | — | 1K |
| 13-as | 1 | 26.88 | 1.12 | Nocconol 90G | 7 | 13-16 | 2K |
| 14-as | 1 | 26.88 | 1.12 | Disponil SLS 128 | 7 | 15 | 1K |

TABLE 4a

Data from Table 4 merely recalculated to mass %

| Formulation Number | Cross-linker, % | Polymer, % | Catalyst, % | Anionic Surfactant, % | Total |
|---|---|---|---|---|---|
| 1-as | 1.56 | 77.64 | 0.80 | 20.00 | 100 |
| 2-as | 1.55 | 76.85 | 1.60 | 20.00 | 100 |
| 3-as | 1.53 | 76.07 | 2.40 | 20.00 | 100 |
| 4-as | 1.51 | 75.29 | 3.20 | 20.00 | 100 |
| 5-as | 1.50 | 74.50 | 4.00 | 20.00 | 100 |
| 6-as | 1.80 | 89.41 | 2.00 | 6.79 | 100 |
| 7-as | 1.80 | 89.42 | 2.00 | 6.78 | 100 |
| 8-as | 1.53 | 76.07 | 2.40 | 20.00 | 100 |
| 9-as | 1.51 | 75.29 | 3.20 | 20.00 | 100 |
| 10-as | 1.50 | 74.50 | 4.00 | 20.00 | 100 |
| 11-as | 1.72 | 85.58 | 2.70 | 10.00 | 100 |
| 12-as | 1.69 | 83.81 | 4.50 | 10.00 | 100 |
| 13-as | 1.51 | 75.29 | 3.20 | 20.00 | 100 |
| 14-as | 1.51 | 75.29 | 3.20 | 20.00 | 100 |

Example 2b—Water Pick-Up

The methodology described in Example 1b above was repeated to evaluate the water pick-up of some formulations containing anionic surfactants. The increase of their weight (g) as a function of time is reported in Table 5 below.

TABLE 5

Water pick-up in grams

| Formulation Number | Dry weight before immersion (g) | 0 h | 22-24 h | 48 h | 120 h |
|---|---|---|---|---|---|
| 3-as | 7.162 | 0 | 0.476 | 0.780 | 1.205 |
| 4-as | 5.788 | 0 | 0.368 | 0.571 | 0.941 |
| 5-as | 5.035 | 0 | 0.337 | 0.508 | 0.887 |
| 6-as | 5.047 | 0 | 0.179 | 0.274 | 0.425 |
| 7-as | 3.961 | 0 | 0.087 | 0.138 | 0.238 |
| 8-as | 4.909 | 0 | 0.074 | 0.091 | — |
| 10-as | 4.148 | 0 | 0.118 | 0.165 | — |
| 11-as | 5.308 | 0 | 0.098 | 0.133 | — |
| 12-as | 5.259 | 0 | 0.076 | 0.108 | — |

Example 2c—Stability

Following the methodology described in Example 1c above, Formulation 10-as has been studied.

TABLE 6

|  | Formulation 10-as-fresh | Formulation 10-as-1 wk @ 40° C. |
|---|---|---|
| SOT (min) | 41 | 63 |
| CID 1 day (mm) | 2.0 | — |
| Dumbbells 7 Days cure — Tensile strength (MPa) | 0.23 | 0.28 |
| Elongation at Break* (%) | 72 | 175 |

*also called ultimate elongation in ASTM 412 D-06

Example 3: Compositions Using Component B) (iii) a Commercial Polymer with Pendant Sulphonic Groups and PVA Material used was Polyvinyl Alcohol (PVA; commercial name MOWIOL® 5-88) commercially available form KURARAY.

Table 7a below shows the composition of the sealants made with PVA. MB and SOT are as defined above.

TABLE 7a

| Formulation Number | MB used | MB amt. (g) | MB amt. (g) | PVA amt. (g) | SOT (min) | Type of cure |
|---|---|---|---|---|---|---|
| 1i | 1 | 30.24 | 1.26 | 3.5 | 60+ | 2K |
| 2i | 1 | 29.925 | 1.575 | 3.5 | 60+ | 2K |
| 3i | 1 | 26.88 | 1.12 | 7 | 60+ | 2K |
| 4i | 1 | 26.6 | 1.4 | 7 | 60+ | 2K |

TABLE 7a-1

Data from Table 7a merely recalculated to mass %

| Formulation Number | Cross-linker, % | Polymer, % | Catalyst, % | PVA, % | Total |
|---|---|---|---|---|---|
| 1i | 1.70 | 84.70 | 3.60 | 10.00 | 100 |
| 2i | 1.69 | 83.81 | 4.50 | 10.00 | 100 |
| 3i | 1.51 | 75.29 | 3.20 | 20.00 | 100 |
| 4i | 1.50 | 74.50 | 4.00 | 20.00 | 100 |

Table 7b below shows the composition of the sealants made with sodium polystyrene sulphonate (NaPSS) with a MW of 75000 D, commercially available form Alfa Aesar. MB and SOT are as defined above.

TABLE 7b

| Formulation Number | MB used | MB amt. (g) | MB amt. (g) | NaPSS amt. (g) | SOT (min) | Type of cure |
|---|---|---|---|---|---|---|
| 5i | 1 | 23.52 | 0.98 | 10.5 | 50 | 2K |
| 6i | 1 | 23.275 | 1.23 | 10.5 | 40-45 | 2K |
| 7i | 2 | 23.52 | 0.98 | 10.5 | ~120 | 2K |
| 8i | 2 | 26.6 | 1.23 | 10.5 | ~120 | 2K |
| 9i | 1 | 30.87 | 0.63 | 3.5 | 90 | 2K |
| 10i | 1 | 30.555 | 0.945 | 3.5 | 70 | 2K |
| 11i | 1 | 30.24 | 1.26 | 3.5 | 70 | 2K |
| 12i | 1 | 29.925 | 1.575 | 3.5 | 30 | 2K |
| 13i | 1 | 27.16 | 0.84 | 7.0 | 80-90 | 2K |
| 14i | 1 | 26.88 | 1.12 | 7.0 | 40-50 | 2K |
| 15i | 1 | 26.6 | 1.4 | 7.0 | 40 | 2K |
| 16i | 2 | 26.74 | 1.26 | 7.0 | >120 | 2K |
| 17i | 2 | 26.42 | 1.575 | 7.0 | >120 | 2K |

TABLE 7b-1

Data from Table 7b merely recalculated to mass %

| Formulation Number | Cross-linker, % | Polymer, % | Catalyst, % | NaPSS, % | Total |
|---|---|---|---|---|---|
| 5i | 1.33 | 65.87 | 2.80 | 30.00 | 100 |
| 6i | 1.31 | 65.18 | 3.51 | 30.00 | 100 |
| 7i | 1.33 | 65.87 | 2.80 | 30.00 | 100 |
| 8i | 1.37 | 68.03 | 3.21 | 27.39 | 100 |
| 9i | 1.74 | 86.46 | 1.80 | 10.00 | 100 |
| 10i | 1.72 | 85.58 | 2.70 | 10.00 | 100 |
| 11i | 1.70 | 84.70 | 3.60 | 10.00 | 100 |
| 12i | 1.69 | 83.81 | 4.50 | 10.00 | 100 |
| 13i | 1.53 | 76.07 | 2.40 | 20.00 | 100 |
| 14i | 1.51 | 75.29 | 3.20 | 20.00 | 100 |
| 15i | 1.50 | 74.50 | 4.00 | 20.00 | 100 |
| 16i | 1.51 | 74.89 | 3.60 | 20.00 | 100 |
| 17i | 1.49 | 74.01 | 4.50 | 20.00 | 100 |

Further Examples/Formulations Evaluated Relative to Conventional Compositions

Sealants as described below were formulated using a SpeedMixer® DAC 150.1 FV-K. A 1-2 mm thick smear was immediately applied onto a flat inert surface to determine SOT.

Preparation: The silicone polymer(s) were first mixed with Genapol (described further below), then the filler ($CaCO_3$ or silica) was added in two equal portions. Next step consisted in adding the cross-linker and finally the Ti-catalyst. The mixing took always 30 sec at 3000 RPM.

Once compounded, the sealant samples were then kept in open identical cylindrical containers (diameter of 4 cm, depth of the sample—3 to 4 cm) for 7 days, exposed at the ambient atmosphere (approx. 50% RH) at 21-25° C. After that time, the skin formed on the top of the sealant is removed. If a cured layer (skin) of below 1.5 cm depth has been formed, the composition is deemed to be a suitable one-component sealant (1K). The skin removed from the container is stored for another 24 h-48 h on a lab bench to allow for complete cure (the side originally facing the bulk was exposed to the atmosphere). Thus obtained cured specimens were then used for evaluation of the water pick-up ability of the formulations.

Water absorbance have been tested using well-cured pre-weighed specimens prepared as described above. These were soaked in phosphate buffered saline (PBS). At pre-determined regular intervals, the specimens were taken out of the PBS wiped to a dry state and weighed. Alternatively, water can be used instead of PBS.

Figure 2:
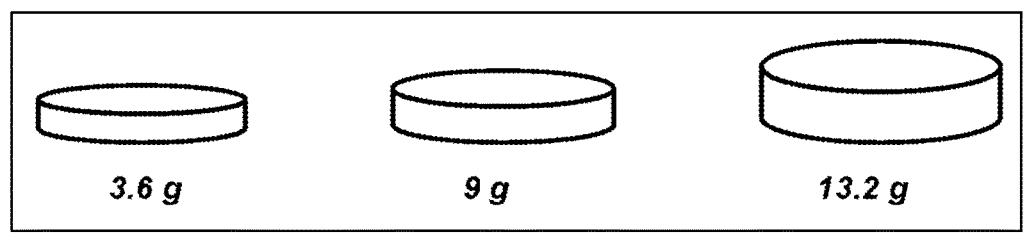
FIG. 2 are drawings of the samples having similar surface but different bulk referred to in FIG. 1.

Silicones are hydrophobic, and it is therefore unlikely that water easily moves inside the material (i.e., from the outer surface to the inside or bulk). Therefore, one needs to verify whether the water pick-up is surface or bulk controlled. To verify this, a sample cured in a cylindrical container has been used to perform the following comparative experiment: Specimens of equal cross-section but different thickness were soaked in PBS and the water uptake was recorded for 5 days (See FIGS. 1 and 2). As shown in FIG. 2, the surface coming from the bases is substantially larger than the surface coming from the height of the cylinders. As seen from the graph in FIG. 1, the water uptake is very similar, indicating a surface-governed phenomenon. Therefore, the comparison of the water uptake data was done solely for discs of same diameter coming from the same containers. The nominal water uptake has been compared, as the process is surface-driven.

Materials:

Catalyst used in all Examples was Tyzor® TnBT, tetra-n-butyl titanate, available from Dorf Ketal.

Genapol PF 40 (Croda) is commercially available from Croda and is an EO/PO block copolymer, HLB16, with a viscosity of approx. 200 mPa·s as per its technical datasheet.

The Following Changes have been Made with Regard to Example 8 from Sakamoto et al. (US 2010/0069531 A1; "Sakamoto"), e.g. Due to Availability/Sourcing:

The OH-terminated silicone polymer was replaced by a mixture of two polymers yielding a similar viscosity.

3-glycydoxypropyl-trimethoxysilane (cross-linker) was replaced by vinyl tri-methoxy silane, total content of cross-linker about 7.4% as in Sakamoto.

The specific EO/PO polymer used by Sakamoto is impossible to source because US 2010/0069531 A1 provides neither a preparation methodology nor a commercial supplier. The material was substituted with Genapol PF 40, to allow comparison between $CaCO_3$— and silica-filled versions.

Samples 1p, 3p, 5p are as described above.

Table A summarizes the mass parts as stated in the original documents as well as the grams of ingredients used in the lab for each comparative example.

Table B represents the same data as in Table A but converted into mass % to allow an easy comparison between the different formulations.

Table C shows the compositional variation of the selected inventive examples and the prior art, comparative examples.

Table D shows the water pick-up of the selected inventive examples and the prior art, comparative examples.

The inventors have produced as close as possible an analogue of Example 8 of Sakamoto (referred to below as comparative example "E8-A"). This material does not pick-up water. The value of +/−0.001 g recorded in Table D is merely the error of the balance. One can therefore conclude that 0.82% of Genapol PF 40 does not generate water pickup.

Relative to E8-A, the inventors have increased the concentration of hydrophilic ingredient (Genapol PF 40) 6 and 13 times to 5% and 10.8%, respectfully (referred to below as examples "E8-B" and "E8-C"). The increase of Genapol PF 40 concentration did produce an increase of the water pick-up, but even at a similar concentration of hydrophilic ingredient, the least (or worse) performing inventive example still picks up 5 to 9 times more water than the best performing comparative example (i.e., compare E8-C to 5p). Moreover, for E8-B and E8-C, a saturation effect was discovered after 48 h: The weight increase at 48 h is (within the experimental error) equivalent to the value recoded at 72 h and 96 h immersion. This means that very little (if any) water is absorbed by the sealant after 48 h of water immersion. In contrast, the inventive examples do show a constant weight increase, e.g. they continue to pick-up water after 48 h and 72 h of immersion.

Using a formulation very close to Example 8 from the teachings of Sakamoto, the inventors have established that 0.82% of Genapol PF 40 in a silica-filled sealant does not result in water pick-up.

Referring to other prior art, example C1 of Vandereeken et al. (WO 2012/119940 A1; "Vandereeken") contains 0.4% Genapol PF 40, but the filler used is $CaCO_3$. $CaCO_3$ is known in the art to pick-up water (see, e.g. Example Table 1 in U.S. Pat. No. 5,007,964 A to Tsukisaka et al.). Therefore, the inventors have repeated the C1 example of Vandereeken (comparative C1-A, 0.41% Genapol PF 40) and measured the water pick-up. One notices that water pick-up of C1-A (equivalent to C1 from Vandereeken) is 5 to 8 times worse than the least performing inventive example (i.e., 5p). Given the result obtained for E8-A (0.8% Genapol PF 40, No water pick-up) one cannot exclude the contribution of the $CaCO_3$ in the water pick-up value recorded for C1-A.

The inventors have further increased the quantity of the hydrophilic ingredient (Genapol PF 40) in a sealant very similar to the teaching Vandereeken of about 10 times (from 0.41 to 3.97%, example C1-B). This increased the water pickup, but still the least performing inventive example picks up from 2 to 10 times more water than C1-B. Among the comparative examples, C1-B absorbs the most water. The comparison of the water pick-up of example C1-B (4% ca. Genapol PF 40, >58% $CaCO_3$) with E8-B and E8-C (5% and 10.8% Genapol PF 40, non-absorbing filler) suggests again that $CaCO_3$ contributes to (if not all of) the water pick-up.

Regardless the physical reason for water pick-up of C1-A and C1-B, these materials absorb substantially less water than the least performing inventive example (i.e., 5p).

In the tables below, "Van." is Vandereeken and "Sak." is Sakamoto.

TABLE A

| | C1 (Van.)* | C1-A (g)** | C1-B (g)** | E8 (Sak.)* | E8-A (g)** | E8-B (g)** | E8-C (g)** |
|---|---|---|---|---|---|---|---|
| OH-terminated PDMS, 5000 cSt | | | | 100 | | | |
| Specific EO/PO | | | | 1 | | | |
| OH-terminated PDMS, 1990 cSt | 30.3 | 30.396 | 26.548 | | 13.058 | 13.345 | 11.553 |
| OH-terminated PDMS, 13500 cSt | | | | | 36.922 | 36.613 | 32.569 |
| Socal 312C ($CaCO_3$) | 59.9 | 59.891 | 59.917 | | | | |
| Genapol PF 40 | 0.4 | 0.418 | 4.032 | | 0.503 | 3.205 | 6.624 |
| Aerosil 974R (treated silica) | | | | 10 | 5.034 | 5.061 | 5.026 |
| Vinyl trimethoxy silane | | | | 8 | 4.490 | 4.503 | 4.489 |
| Methyl trimethoxy silane | 3.2 | 3.201 | 3.205 | | | | |
| 3-glycydoxypropyl-trimethoxysilane | | | | 1 | | | |
| Ti-catalyst | 1 | 0.991 | 0.964 | 2 | 0.980 | 1.040 | 0.970 |
| tri-methyl-terminated PDMS | 7 | 6.977 | 6.974 | | | | |

*Parts as specified in the document.
**Grams as made in the lab.

TABLE B

Compositions (mass % of reference and lab sealants).

| | C1 (Van.) | C1-A | C1-B | E8 (Sak.) | E8-A | E8-B | E8-C |
|---|---|---|---|---|---|---|---|
| Oh-terminated PDMS, 5000 cSt | | | | 81.98% | | | |
| Specific EO/PO | | | | 0.82% | | | |
| OH-terminated PDMS, 1990 cSt | 29.77% | 29.84% | 26.12% | | 21.42% | 20.92% | 18.87% |
| OH-terminated PDMS, 13500 cSt | | | | | 60.54% | 57.42% | 53.19% |
| Socal 312C ($CaCO_3$) | 58.84% | 58.79% | 58.95% | | | | |
| Genapol PF40 | 0.39% | 0.41% | 3.97% | | 0.82% | 5.03% | 10.82% |
| Aerosil 974R (treated silica) | | | | 8.20% | 8.25% | 7.94% | 8.21% |
| Vinyl trimethoxy silane | | | | 6.56% | 7.36% | 7.06% | 7.33% |
| Methyl trimethoxy silane | 3.14% | 3.14% | 3.15% | | | | |
| 3-glycydoxypropyl-trimethoxysilane | | | | 0.82% | | | |

TABLE B-continued

Compositions (mass % of reference and lab sealants).

| | C1 (Van.) | C1-A | C1-B | E8 (Sak.) | E8-A | E8-B | E8-C |
|---|---|---|---|---|---|---|---|
| TYZOR (Ti catalyst) | 0.98% | 0.97% | 0.95% | 1.64% | 1.61% | 1.63% | 1.58% |
| tri-methyl-terminated PDMS | 6.88% | 6.85% | 6.86% | | | | |
| Total | 100% | 100% | 100% | 100% | 100% | 100% | 100% |
| SOT [minutes] | | 5 | 5 | | 8-10 | 11-13 | 4 |
| Type of Cure (1K vs. 2K) | | 1K | 1K | | 1K | 1K | 1K |

The bolded cells/numerals are merely a guide to facilitate the comparison.

TABLE C

Compositional variation of selected inventive and all comparative examples

| Formulation/ Sample Number | MB amt. (g) | Catalyst amt. (g) | Polyox WSR 205 amt. (g) | SOT (min) | Type of cure | % cross-linker | % EO/PO (Polyox or Genapol) | % catalyst |
|---|---|---|---|---|---|---|---|---|
| 1p | 35.64 | 0.36 | 4 | 50 | 1K | 1.76% | 10.00% | 0.90% |
| 3p | 34.92 | 1.08 | 4 | 35 | 1K | 1.72% | 10.00% | 2.70% |
| 5p | 34.2 | 1.8 | 4 | 15 | 1K | 1.69% | 10.00% | 4.50% |
| Comparative 1 | 35.64 | 0.36 | 0 | 20 | 1K | 1.95% | 0.00% | 1.00% |
| C1-A | | | | 5 | 1K | 3.14% | 0.41% | 0.97% |
| C1-B | | | | 5 | 1K | 3.15% | 3.97% | 0.95% |
| E8-A | | | | 8-10 | 1K | 7.36% | 0.82% | 1.61% |
| E8-B | | | | 11-13 | 1K | 7.06% | 5.03% | 1.63% |
| E8-C | | | | 4 | 1K | 7.33% | 10.82% | 1.58% |

TABLE D

Water pick-up of selected inventive and all comparative examples

| | | Weight increase (g) | | | | |
|---|---|---|---|---|---|---|
| Formulation/ Sample Number | Dry weight before immersion (g) | 0 h | 22 h | 48 h | 72 h | 96 h |
| 1p | 4.197 | 0 | 0.201 | 0.256 | 0.282 | 0.32 |
| 3p | 6.313 | 0 | 0.121 | 0.159 | 0.199 | 0.214 |
| 5p | 5.863 | 0 | 0.091 | 0.148 | 0.175 | 0.208 |
| Comparative 1 | 4.2 | 0 | 0.008 | — | 0.007 | 0.01 |
| C1-A | 4.483 | 0 | 0.019 | 0.025 | 0.022 | 0.025 |
| C1-B | 3.842 | 0 | 0.009 | 0.008 | 0.059 | 0.107 |
| E8-A | 1.175 | 0 | 0.001 | 0 | 0 | −0.001 |
| E8-B | 1.27 | 0 | 0.018 | 0.020 | 0.023 | 0.023 |
| E8-C | 1.191 | 0 | 0.039 | 0.067 | 0.066 | 0.066 |

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A silicone room temperature curable sealant/adhesive composition comprising:
    A) at least 50% by weight of one or more organopolysiloxanes selected from:

(i) $(R''O)_{3-a}(R)_a Si$—Z—$(Si(R)_2$—O$)_X$—$Si(R)_2$—Z—$Si(OR'')_{3-a}(R)_a$
    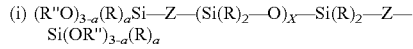

where each R is free of aliphatic unsaturation and is independently selected from the group consisting of monovalent hydrocarbon, monovalent halohydrocarbon, and monovalent cyanoalkyl radicals having from 1 to 18 carbon atoms, each R" is independently a monovalent hydrocarbon group having 1 to 6 carbon atoms, Z is a divalent hydrocarbon radical or combination of divalent hydrocarbon radicals and siloxane radicals, a is 0 or 1, and x is of a value such that component A)(i) has a viscosity of from 0.5 to 3000 Pa·s at 25° C.;

(ii) alpha, omega-diorganopolysiloxanes of the formula $(HO)_{3-b}(R)_b Si$—O—$(Si(R)_2$—O$)_y$—$Si(OH)_{3-b}(R)_b$
    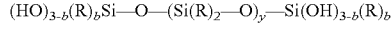

where each R is free of aliphatic unsaturation and is independently selected from the group consisting of monovalent hydrocarbon, monovalent halohydrocarbon, and monovalent cyanoalkyl radicals having from 1 to 18 carbon atoms, b is 0, 1 or 2, and y is of a value such that component A)(ii) has a viscosity of from 0.5 to 3000 Pa·s at 25° C.; or (iii) mixtures of the above;
    B) 5 to 35% by weight of a hydrophilic material selected from:
        (i) hydrophilic and/or water soluble resins based on polyethylene oxide and/or polypropylene oxide;
        (ii) one or more anionic surfactants;
        (iii) polymers containing ionisable groups; and
        (iv) mixtures of two or more of (i), (ii) and (iii);
    C) 0.5 to 7.5% by weight of a cross-linker selected from a silane or siloxane cross linker containing at least two alkoxy or alkenyloxy groups, or silyl functional molecules having at least two silyl groups, each silyl group containing at least one alkoxy or alkenyloxy group;
    D) 0.5 to 5% by weight titanate or zirconate catalyst; and
    E) optionally, one or more ingredients selected from fillers, co-catalysts, rheological modifiers, plasticisers, adhesion promoters, compatibilizers, pigments, heat stabilizers, flame retardants, UV stabilizers, chain extenders, electrically and/or heat conductive fillers, and/or fungicides/biocides;
    wherein the total % weight of A)+B)+C)+D)+E) is 100%;
    wherein component B) comprises component B)(i);
    wherein component B)(i) comprises polyoxyalkylene polymers comprising recurring oxyalkylene units illustrated by the average formula $(-C_nH_{2n}-O-)_y$ wherein n is an integer from two to four and y is an integer of at least four; and
    wherein the number average molecular weight of each polyoxyalkylene polymer is greater than 50000.

2. The silicone room temperature curable sealant/adhesive composition in accordance with claim 1, wherein component B)(i) is free of silane or siloxane modification.

3. The silicone room temperature curable sealant/adhesive composition in accordance with claim 1, wherein the number average molecular weight of each polyoxyalkylene polymer is greater than 75000.

4. The silicone room temperature curable sealant/adhesive composition in accordance with claim 1, wherein component B) comprises component B)(ii) and wherein the one or more anionic surfactants are selected from sodium/potassium sulphonates, alkenyl sulphonates, alkyl sulphates, alkyl-benzene sulphonates, potassium alkyl phosphates, alkyl succinates, alkyl sulphosuccinates and N-alkyl sarcosinates and sodium, magnesium, ammonium, and the mono-, di- and triethanolamine salts of alkyl and aralkyl sulphates as well as the salts of alkaryl sulphonates and/or mixtures thereof.

5. The silicone room temperature curable sealant/adhesive composition in accordance with claim 1, wherein component B) comprises component B)(iii) and wherein the hydrophilic material is selected from homopolymers and copolymers comprising vinylsulphonic, styrenesulphonic, naphthalenesulphonic or acrylamidoalkylsulphonic units and their salts and also copolymers thereof with an unsaturated comonomer.

6. The silicone room temperature curable sealant/adhesive composition in accordance with claim 1, stored before use in one or two parts.

7. The silicone room temperature curable sealant/adhesive composition in accordance with claim 1, which is a one-component composition which, when stored at a temperature above 30° C., prior to cure retains at least 50% of its mechanical strength upon cure.

8. A silicone elastomer resulting from curing the silicone room temperature curable sealant/adhesive composition in accordance with claim 1.

9. The silicone elastomer of claim 8, having a water pick-up of at least 0.01 gram of water per gram of silicone elastomer, when the silicone elastomer is immersed in water or phosphate buffer saline for 24h.

10. A sealant comprising the silicone elastomer in accordance with claim 8.

11. A method of controlling and/or restraining aqueous leaks, said method comprising disposing a silicone elastomer where joint expansion is desired, wherein the silicone elastomer is the silicone elastomer in accordance with claim 9.

12. A patch comprising the silicone elastomer in accordance with claim 8.

13. A method of filling a space defined between two substrates so as to form an arrangement, the method comprising:
   a) providing the silicone room temperature curable sealant/adhesive composition in accordance with claim 1;
   b1) applying the composition to a first substrate, and bringing a second substrate in contact with the composition that has been applied to the first substrate; or
   b2) filling a space defined by a first substrate and a second substrate with the composition; and
   c) curing the composition, thereby forming the arrangement.

14. The silicone room temperature curable sealant/adhesive composition in accordance with claim 1, wherein component E) is present.

15. A medical device comprising the silicone elastomer in accordance with claim 8.

16. A diaper comprising the silicone elastomer in accordance with claim 8.

17. The silicone room temperature curable sealant/adhesive composition in accordance with claim 1, wherein component B)(i) is present in the composition in amount of from about 10 to about 30% by weight.

18. The silicone room temperature curable sealant/adhesive composition in accordance with claim 1, wherein component B)(i):
   i) has a molecular weight of from about 75,000 to about 20,000,000 g/mol;
   ii) has a viscosity of about 6,800 to about 8,800 cP; or
   iii) both i) and ii).

19. The silicone room temperature curable sealant/adhesive composition in accordance with claim 1, wherein the composition is substantially, or optionally completely free of:
   i) silane-modified (poly)akylene oxide compounds;
   ii) siloxane-modified (poly)akylene oxide compounds; or
   iii) both i) and ii).

20. The silicone room temperature curable sealant/adhesive composition in accordance with claim 1, wherein the curable sealant/adhesive composition has a skin over time (SOT) of less than 1 hour.

* * * * *